US010489696B2

(12) United States Patent
Suzuki et al.

(10) Patent No.: US 10,489,696 B2
(45) Date of Patent: Nov. 26, 2019

(54) ARTICLE AND CODE ENGRAVING METHOD

(71) Applicant: HITACHI AUTOMOTIVE SYSTEMS, LTD., Ibaraki (JP)

(72) Inventors: Yasushi Suzuki, Hitachi (JP);
Toshiyuki Take, Fujisawa (JP);
Takashi Murakami, Atsugi (JP);
Kokichi Nakayama, Kawasaki (JP);
Kazushi Imamura, Yamanashi (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/737,458

(22) PCT Filed: Jun. 14, 2016

(86) PCT No.: PCT/JP2016/067655
§ 371 (c)(1),
(2) Date: Dec. 18, 2017

(87) PCT Pub. No.: WO2017/002605
PCT Pub. Date: Jan. 5, 2017

(65) Prior Publication Data
US 2018/0197054 A1    Jul. 12, 2018

(30) Foreign Application Priority Data

Jun. 30, 2015 (JP) .................................. 2015-132114

(51) Int. Cl.
*G06K 19/06* (2006.01)
*B23K 26/352* (2014.01)
(Continued)

(52) U.S. Cl.
CPC .... *G06K 19/06121* (2013.01); *B23K 26/3576* (2018.08); *B23K 26/362* (2013.01); *G06K 1/12* (2013.01); *G06K 19/06037* (2013.01)

(58) Field of Classification Search
CPC .... G06K 1/02; G06K 19/06; G06K 19/06046; G06K 19/06121; G06K 19/06009;
(Continued)

(56) References Cited

U.S. PATENT DOCUMENTS 5,268,566 A * 12/1993 Wakaumi ............... G06K 1/125
235/462.01
5,406,060 A * 4/1995 Gitin .................. G06K 7/10732
235/462.42

(Continued)

FOREIGN PATENT DOCUMENTS

| JP | 06-266871 | 9/1994 |
|---|---|---|
| JP | 2006-036443 | 2/2006 |
| JP | 2006-134299 | 5/2006 |
| JP | 2010-009274 | 1/2010 |

OTHER PUBLICATIONS

International Search Report dated Aug. 16, 2016 in International Application No. PCT/JP2016/067655.

*Primary Examiner* — Steven S Paik
*Assistant Examiner* — April A Taylor
(74) *Attorney, Agent, or Firm* — Wenderoth, Lind & Ponack, L.L.P.

(57) ABSTRACT

An article allows an engraved code to be detected. The engraved code includes a plurality of dot dented portions defined on the article. Each of the dot dented portions has a quadrilateral pyramid shape with a coating layer on a prior stage dented portion having a quadrilateral pyramid shape. Corner dented portions dented at acute angles outward along (Continued)

a diagonal direction are defined at four corner positions of an opening peripheral edge portion of the prior stage dented portion.

9 Claims, 12 Drawing Sheets

(51) Int. Cl.
*B23K 26/362* (2014.01)
*G06K 1/12* (2006.01)

(58) Field of Classification Search
CPC ....... G06K 19/06037; G06K 19/06159; B23K 26/362; B23K 26/384; B23K 26/386; B23K 26/352; B23K 26/354; B23K 26/359; B23K 26/36; B23K 26/364; G07F 1/06
See application file for complete search history.

(56) References Cited

U.S. PATENT DOCUMENTS

| | | | | |
|---|---|---|---|---|
| 5,602,378 | A * | 2/1997 | Vaarala | G06K 7/10861 235/440 |
| 6,135,350 | A * | 10/2000 | White | B44B 3/061 235/380 |
| 6,550,677 | B1 * | 4/2003 | Imai | G06K 19/06009 235/454 |
| 6,573,523 | B1 * | 6/2003 | Long | G06K 9/2036 235/454 |
| 2006/0051562 | A1 * | 3/2006 | Sakuma | G06K 19/06046 428/195.1 |
| 2012/0022680 | A1 | 1/2012 | Tanida et al. | |
| 2013/0264389 | A1 * | 10/2013 | Shaffer | G07D 7/00 235/462.2 |
| 2014/0263667 | A1 * | 9/2014 | Mege | G06K 19/06159 235/494 |

* cited by examiner

ARTICLE AND CODE ENGRAVING METHOD

CROSS-REFERENCE TO RELATED APPLICATIONS

The present application claims priority to Japanese Patent Application No. 2015-132114 filed on Jun. 30, 2015. The entire disclosure of Japanese Patent Application No. 2015-132114 filed on Jun. 30, 2015 including the specification, the claims, the drawings, and the abstract is incorporated herein by reference in its entirety.

The entire disclosure of Japanese Patent Application Publication No. 2006-134299 including the specification, the claims, the drawings, and the abstract is incorporated herein by reference in its entirety.

TECHNICAL FIELD

The present invention relates to a managed article (a management target component) and an engraving method.

BACKGROUND ART

An engraved code formed by a plurality of conical dot holes is formed on a surface of a component, and this engraved code is optically detected (for example, refer to Japanese Patent Application Publication No. 2006-134299).

Technical Problem

An excellently detectable engraved code is desired.

SUMMARY OF INVENTION

An object of the present invention is provide to a managed article including an excellently detectable engraved code and an engraving method.

Solution to Problem

To achieve the above-described object, according to one aspect of the present invention, an engraved code includes a plurality of dot dented portions. Each of the dot dented portions is formed by coating a prior stage dented portion with a coating layer. The prior stage dented portion includes a polygonal prior stage opening peripheral edge portion. A corner dented portion dented at an acute angle outward is formed at a corner position of the prior stage opening peripheral edge portion.

Advantageous Effects of Invention

According to the present invention, the engraved code can be excellently detected.

DESCRIPTION OF EMBODIMENTS

Figure 1:
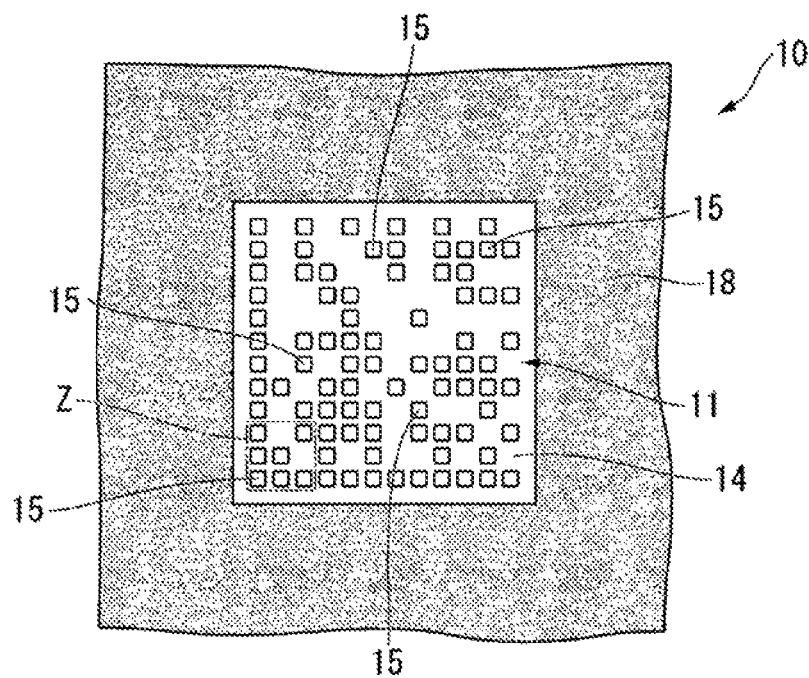
FIG. 1 is a partial plan view illustrating an engraved code of a managed article according to an embodiment.

An embodiment will be described with reference to FIGS. 1 to 11. As illustrated in FIG. 1, a managed article (a management target component) 10 according to the embodiment includes an engraved code 11. The engraved code 11 is a readout code (a two-dimensional code) read out by a readout apparatus, and functions to indicate various kinds of information regarding the managed article 10 with it formed thereon. Examples of the information indicated by the engraved code 11 include an identification of a manufacturer that has manufactured the managed article 10, an identification of a manufacturing factory, a product model, a manufacturing date, and a manufacturing lot number. The two-dimensional code may be any code as long as this is a two-dimensional code determined by various kinds of standards. A quadrilateral engraved code is especially effective for the present invention although the engraved code may be a different kind of code.

The engraved code 11 according to the present embodiment includes a rectangular planar base surface 14, and a plurality of dot dented portions 15 formed within a range of the base surface 14. Now, the engraved code 11 in the illustrated example is a code in the form of a matrix of twelve rows×twelve columns, and is 4 to 5 mm in size on one side. In other words the engraved code 11 is constructed in such a manner that respective positions of intersection points between twelve horizontal lines arranged in parallel at equal intervals to each other, and twelve vertical lines arranged in parallel at equal intervals to each other that are disposed orthogonally to these twelve horizontal lines at equal intervals to these twelve horizontal lines are set at dot allocable positions, and the dot dented portion 15 is arranged at a position selected and set from these dot allocable positions. The code in the form of the matrix of twelve rows×twelve columns means presence of 144 dot allocable positions.

Figure 2:
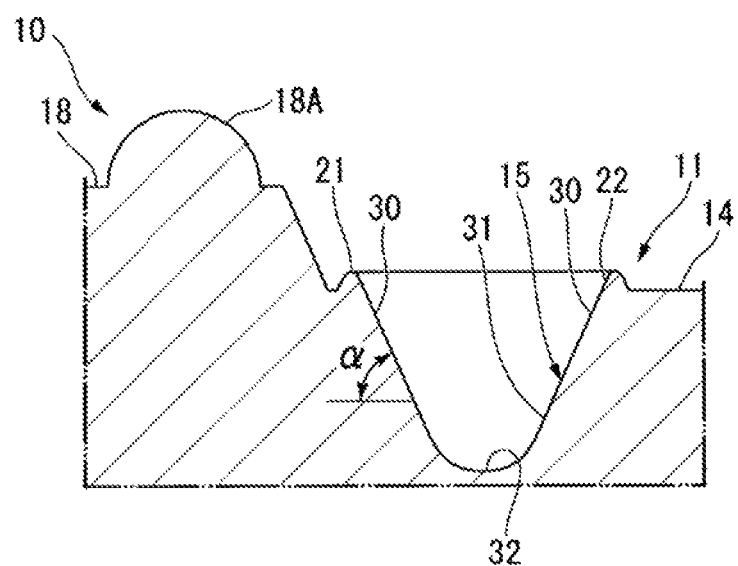
FIG. 2 is a cross-sectional view illustrating a dot dented portion of the managed article according to the embodiment.

As illustrated in FIG. 2, the base surface 14 is formed by shaving a surface 18 of the managed article 10 into a flat surface, and is formed at a position more dented than the surface 18 surrounding the base surface 14. In FIG. 2, an arc-shaped protruding portion 18A is illustrated on the surface 18, but this illustration schematically indicates micro unevenness like a surface of, for example, cast iron and the protruding portion 18A is actually formed as random unevenness.

Figure 3:
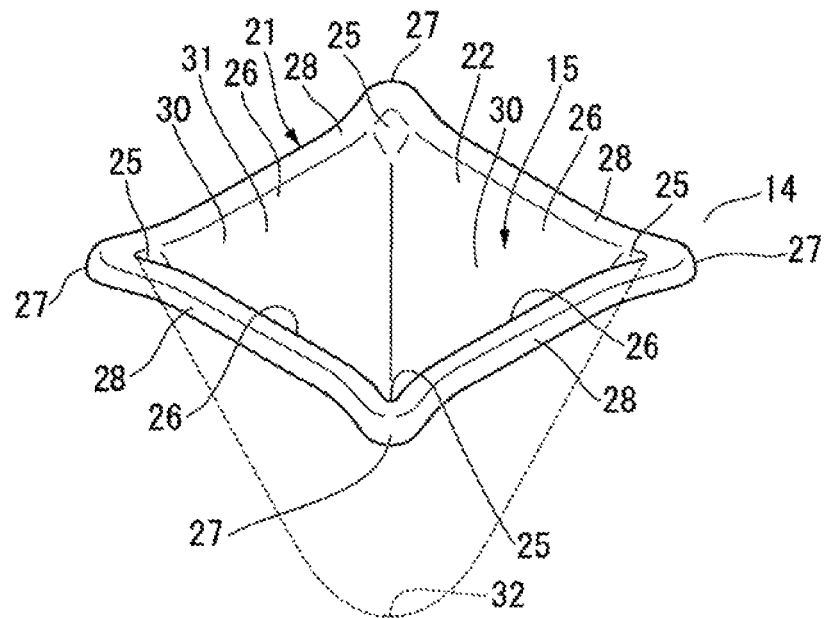
FIG. 3 is a perspective view illustrating the dot dented portion of the managed article according to the embodiment.
Figure 4:
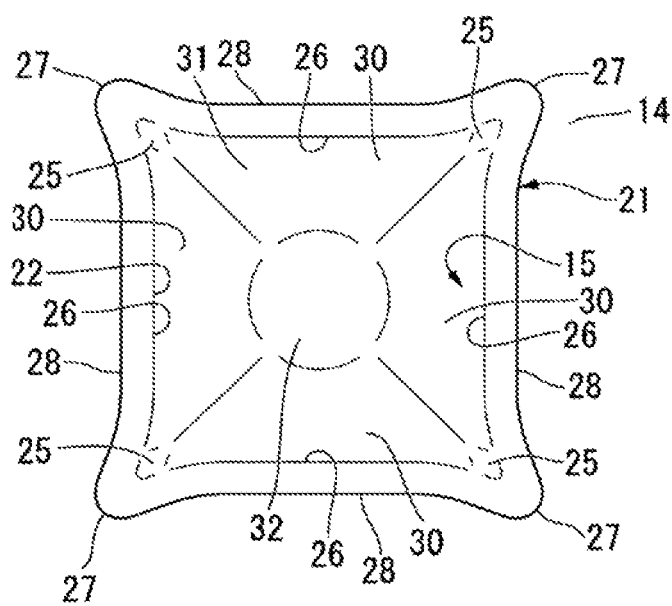
FIG. 4 is a plan view illustrating the dot dented portion of the managed article according to the embodiment

The dot dented portion 15 is formed by being further dented from the base surface 14. The dot dented portion 15 is formed by being dented from the base surface 14 in a direction orthogonal to the base surface 14, and is shaped like a tapering quadrangular pyramid gradually narrowing toward a deep side, i.e., a bottom side thereof, as illustrated in FIG. 3. More specifically, the dot dented portion 15 is provided as a hole having a square pyramid shape. A protruding portion 21 is formed around the dot dented portion 15. The protruding portion 21 protrudes beyond the base surface 14 so as to surround an entire perimeter of the dot dented portion 15. As illustrated in FIG. 4, a peripheral edge of the protruding portion 21 has a quadrilateral shape, more specifically, a square shape. As will be described below, the protruding portion 21 is a protruding portion unintentionally generated when the dot dented portion 15 is processed, and is unnecessary if an employed processing method does not result in the formation of this protruding portion 21.

As illustrated in FIG. 3, an opening peripheral edge portion 22 of the dot dented portion 15 that is located at an opening end of the dot dented portion 15 serves as an inner peripheral edge portion of the protruding portion 21. The opening peripheral edge portion 22 of the dot dented portion 15 has a quadrilateral shape with corner dented portions 25, which are dented at acute angles outward in a diagonal direction, formed on four corner positions of the quadrilateral. More specifically, the opening peripheral edge portion 22 has a square shape with the corner dented portions 25, which are dented at the acute angles outward in the diagonal direction, formed at the four corner positions of the square. The opening peripheral edge portion 22 includes a linear intermediate edge portion 26 between the corner dented portions 25 circumferentially adjacent to each other. The intermediate edge portions 26 circumferentially adjacent to each other are arranged so as to extend orthogonally to each other. The protruding portion 21 is formed in such a manner that V-shaped corner protruding portions 27, which protrudes at acute angles outward in the diagonal direction, are formed at four corner positions of the square with a linear intermediate extending portion 28 extending between the corner protruding portions 27 circumferentially adjacent to each other, so as to allow the opening peripheral edge portion 22 serving as the inner peripheral edge portion of the protruding portion 21 to have the above-described shape. The intermediate extending portions 28 circumferentially adjacent to each other are arranged so as to extend orthogonally to each other.

Figure 5:
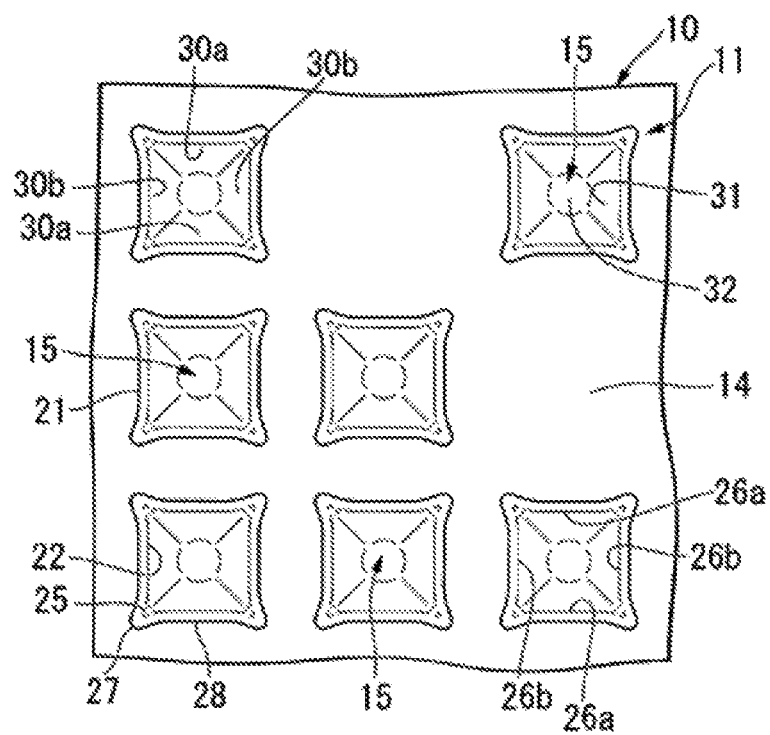
FIG. 5 is a plan view illustrating a Z portion illustrated in FIG. 1 in the engraved code of the managed article according to the embodiment.

The dot dented portion 15 includes four inclined wall surfaces 30 as planes (flat surfaces) illustrated in FIG. 4, which are inclined with respect to a depth direction of the dot dented portion 15 (the plane refers to such a surface that a straight line passing through arbitrarily two points thereon is constantly located on this surface). The above-described four intermediate edge portions 26 of the opening peripheral edge portion 22 of the dot dented portion 15 serve as upper end edge portions of the four wall surfaces 30. As illustrated in FIG. 5, among these four wall surfaces 30, two wall surfaces 30a that are one of two pairs of wall surfaces facing each other extend along an arrangement direction of the dot allocable positions lined up in the same row (a horizontal direction in FIG. 5), and two wall surfaces 30b that are the other of the two pairs of wall surfaces facing each other (in a vertical direction in FIG. 5) extend along an arrangement direction of the dot allocable positions lined up in the same column (the vertical direction in FIG. 5). Further, in the dot dented portion 15, among the four intermediate edge portions 26a of the opening peripheral edge portion 22, two intermediate edge portions 26 that are one of two pairs of intermediate edge portions 26 facing each other extend along the arrangement direction of the dot allocable positions lined up in the same row, and two intermediate edge portions 26b that are the other of the two pairs of intermediate edge portions 26 facing each other extend along the arrangement direction of the dot allocable positions lined up in the same column.

The four wall surfaces 30 of the dot dented portion 15 illustrated in FIG. 3 are each inclined at a similar angle with respect to the base surface 14. The dot dented portion 15 forms a peripheral wall surface 31 shaped like a quadrilateral pyramid truncated at a top side thereof with these four planar wall surfaces 30a, 30b, 30a, and 30b connected to one another. A bottom surface 32 of the dot dented portion 15 connects deep sides of the four wall surfaces 30 by being spherically curved. In other words, the bottom surface 32 of the dot dented portion 15 is formed so as to close a deep side of the peripheral wall surface 31. Therefore, the dot dented portion 15 has a quadrilateral pyramid shape, and the bottom surface 32 on a deep side thereof has a spherical shape. The spherical surface of this bottom surface 32 is a shape unintentionally generated when the dot dented portion 15, which will be described below, is processed. Therefore, as the curvature radius of the spherical surface reduces, the bottom surface 32 approaches a desirable shape. Theoretically, it is desirable and ideal that this surface achieves a perfect quadrilateral pyramid shape without being the spherical surface.

Further, a depth of the bottom portion 32 is approximately kept constant. Conventionally, there has been known an engraved code including a conical dot formed by pressing a dot pin, but pressing the dot pin leads to unevenness of the depth, thereby resulting in a change in apparent darkness/lightness of the dot and thus a failure to read the dot correctly.

The dot allocable positions are set in such a manner that, when the dot dented portions 15 are formed at positions adjacent to each other, these dot dented portions 15 are spaced apart from each other in any of the row direction and the column direction, and are set in such a manner that the protruding portions 21 including the opening peripheral edge portions 22 of the dot dented portions 15 are also spaced apart from each other.

As illustrated in FIG. 5, the engraved code 11 including the base surface 14, the protruding portion 21, and the dot dented portion 15 is formed by performing an engraved code formation process that applies laser processing on the managed article 10. In the following description, the engraved code formation process will be described referring to an example in which the managed article 10 is formed by casting.

It is desirable to engrave the engraved code 11 on the managed article 10 at as early a stage as possible to manage it, to carry out individual management. Therefore, the engraved code is formed immediately after the cast is manufactured.

Figure 6A:
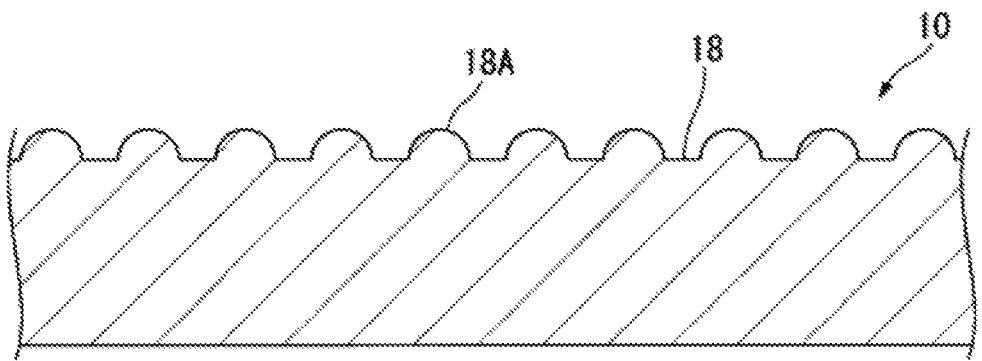
FIG. 6A is a cross-sectional view illustrating the managed article before foundation processing according to the embodiment.
Figure 6B:
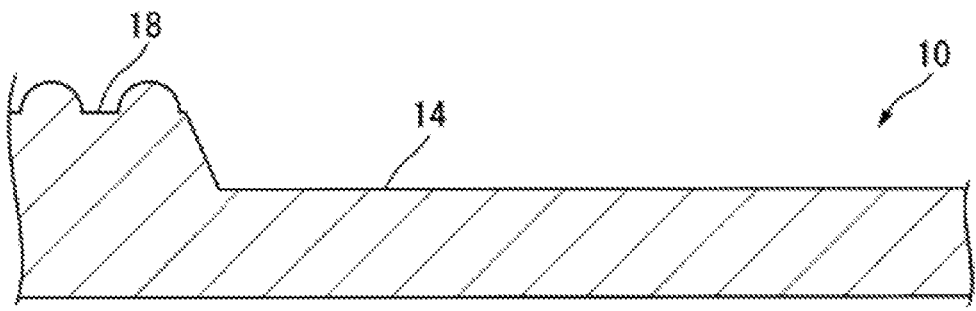
FIG. 6B is a cross-sectional view illustrating the managed article after the foundation processing according to the embodiment.

First, before the engraved code 11 is formed, i.e., before the engraved code formation process is performed, the surface 18 of the managed article 10 is rough in a casing-surface state and is shaped to have the unevenness 18A as illustrated in FIG. 6A. The engraved code formation process is started with foundation processing for leveling the surface 18 of the managed article 10 in this state by laser processing to form the planar base surface 14 as illustrated in FIG. 6B. In the foundation processing, laser light is repeatedly linearly moved in the horizontal direction while the position thereof is sequentially shifted in the vertical direction. In a case where the surface of the managed article 10 is largely uneven, even an intensity of the laser light can be controlled according to the state of the unevenness. In this manner, the planar base surface 14 flatter than the casting-surface state is formed on the managed article 10.

Figure 6C:
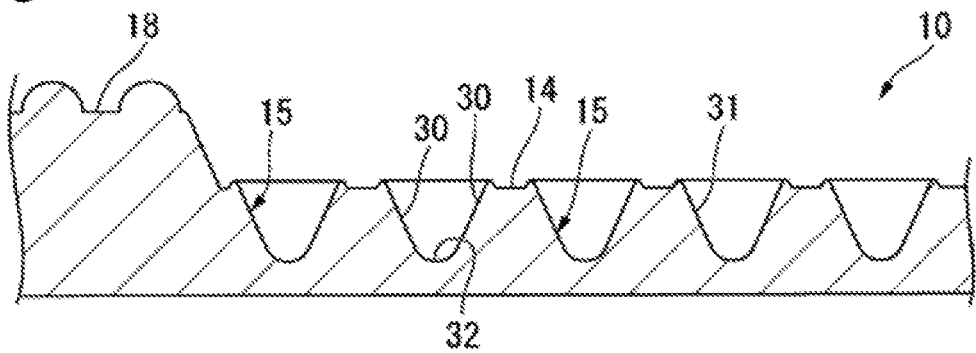
FIG. 6C is a cross-sectional view illustrating the managed article after the engraved code is formed according to the embodiment.
Figure 7:
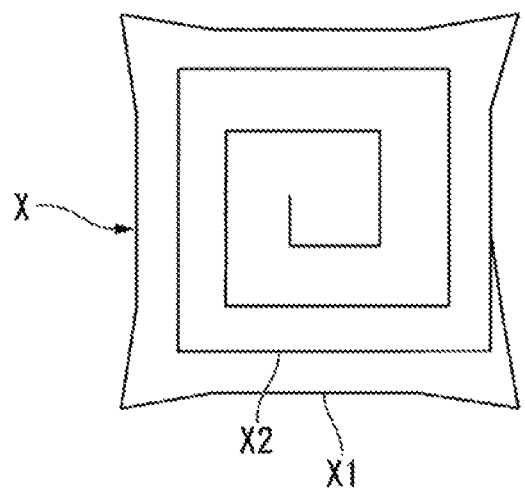
FIG. 7 is a plan view illustrating a movement track of a processing laser that processes the managed article according to the embodiment.

The foundation processing is followed by an engraving process for the dot dented portion 15 dented perpendicularly to the base surface 14 by laser processing as illustrated in FIG. 6C. At this time, an irradiation track of laser light forming one dot dented portion 15 matches, for example, a track X drawing a rectangular spiral from an outer side to an inner side as illustrated in FIG. 7. At this time, an outermost track X1 of the spiral has such a shape that each of corner portions of the rectangle protrudes at an acute angle outward in the diagonal direction, and a more inner track X2 than that has such a shape that all corner portions thereof are orthogonally bent. A density of the rectangular spiral track X of the laser light in an inward/outward direction is different according to a position in the inward/outward direction.

For example, the density is set in such a manner that the track X has a high density in a range where the four wall surfaces 30 are formed so as to increase flatness of the wall surfaces 30, and has a low density in a range where the bottom surface 32 is formed, which does not require the flatness.

Further, one dot dented portion 15 is formed by controlling the intensity and a movement speed of the laser light according to the position and moving the laser light as at least one of a movement from the outer side to the inner side and a movement from the inner side to the outer side of the above-described track while controlling a depth, and further moving the laser light a plurality of times as appropriate, thereby melting the managed article 10 to form the four planar wall surfaces 30, the one spherical bottom surface 32, and the four corner dented portions 25, as illustrated in FIGS. 3 and 4. The control of the movement track, the movement speed, and the intensity of the laser light at this time is set according to a condition such as a material of the managed article 10 as appropriate.

Now, an extra thickness of the managed article 10 melted when the dot dented portion 15 is formed is discharged toward the outer side with respect to the dot dented portion 15, thereby forming the protruding portion 21 protruding toward the outer side with respect to the base surface 14 around the opening of the dot dented portion 15. The dot dented portion 15 is more dented than the protruding portion 21 by being shaped into the quadrilateral pyramid. As illustrated in FIG. 1, the code engraving process leads to the formation of a plurality of such dot dented portions 15 at the positions selected and set in advance from the dot allocable positions. Then, this is followed by cleaning for removing soot on the base surface 14 by repeatedly linearly moving laser light in, for example, the horizontal direction while sequentially shifting the position thereof in the vertical direction. The engraved code 11 is formed on the managed article 10 by performing the above-described engraved code formation process.

If unevenness is undesirably generated on the bottom surface 32, bottom portion smoothing processing may be performed to smooth the bottom portion 32 by irradiating the unevenness on the bottom portion with laser light.

As illustrated in FIG. 5, the engraved code 11 formed by the engraved code formation process includes the base surface 14, the plurality of protruding portions 21 protruding toward the outer side with respect to the base surface 14, and the plurality of dot dented portions 15 more dented than the protruding portion 21 at the inner position of the protruding portion 21 corresponding to each of them.

An appropriate subsequent process will be performed on the managed article 10 with the engraved code 11 formed thereon by the engraved code formation process in this manner while this engraved code 11 is read out and the component is managed based on this engraved code 11. Examples of this subsequent process include a processing process for performing processing such as cutting of each of the portions, a coating process for forming a coating layer such as a plating layer such as electroplating and an electrodeposition coating layer such as cation coating, and a mounting process for mounting another component.

As another code engraving process, first, a first step is carved by drawing the rectangular spiral from the outer side to the inner side as the irradiation track of the laser light as illustrated in FIG. 7 similarly to the above-described process, and then similarly drawing the rectangular spiral from the outer side to the inner side as illustrated in FIG. 7 for another dot dented portion 15. While this other dot dented portion 15 is carved, the dot dented portion 15 carved before that is cooled down. This operation is repeated twice or three times. A hole having an inverted pyramid shape is formed by gradually reducing the size of the rectangular spiral at these second and third repetitions, thereby more deeply carving a second step and a third step. The steps on the inclined surface at this time are melted by the laser light to some degree, and therefore the flat inclined wall surface 30 is formed.

The readout apparatus for reading out the engraved code 11 includes a light source, a detection device, and an analysis device. The light source irradiates the base surface 14 with light from the direction perpendicular to the base surface 14. The detection device is, for example, a CCD camera that detects, in the direction perpendicular to the base surface 14, an image of the engraved code 11 irradiated with the light by the light source. The analysis device analyzes the image detected by the detection device to identify a shape of the engraved code 11. When the engraved code 11 is irradiated with the light, the inclined wall surfaces 30 of the dot dented portion 15 reflect reflection light of the light from the light source in a direction different from the detection device, so that the detection device detects such an image that the dot dented portion 15 appears as a black dot having the same square shape as the inner opening shape of the opening peripheral edge portion 22 thereof, and portions other than the dot dented portion 15 appear in white. The analysis device detects a shape of a collection of these dots as the shape of the engraved code 11.

Figure 8:
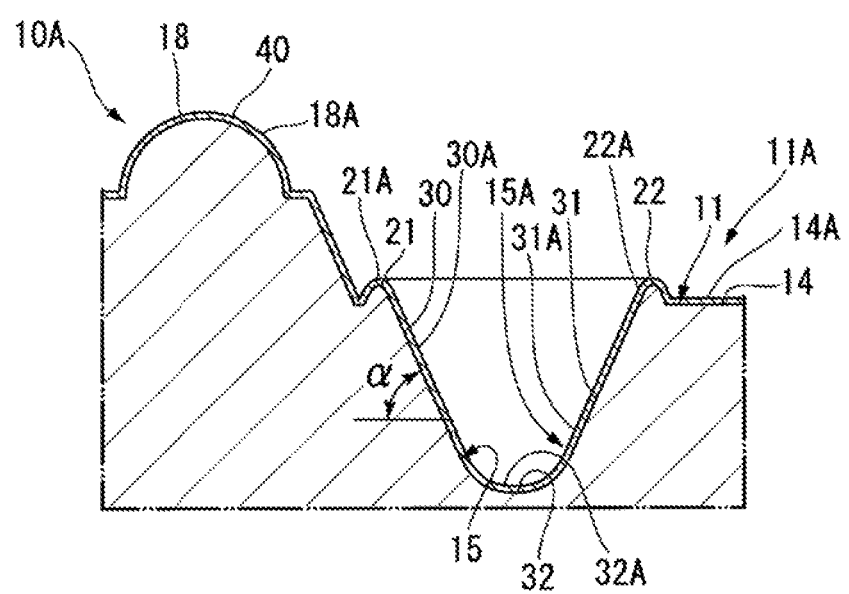
FIG. 8 is a cross-sectional view illustrating the dot dented portion after the managed article is coated according to the embodiment.

When a coating layer 40 is formed on the managed article 10 after the engraved code formation process, in the coating process as illustrated in FIG. 8, a managed article 10A after the coating layer 40 is formed includes a surface 18A and an engraved code 11A. The surface 18A is formed by coating the surface 18 with the coating layer 40. The engraved code 11A is formed by coating the engraved code 11 with the coating layer 40. At this time, the coating layer 40 is formed so as to have an approximately constant thickness.

Figure 9:
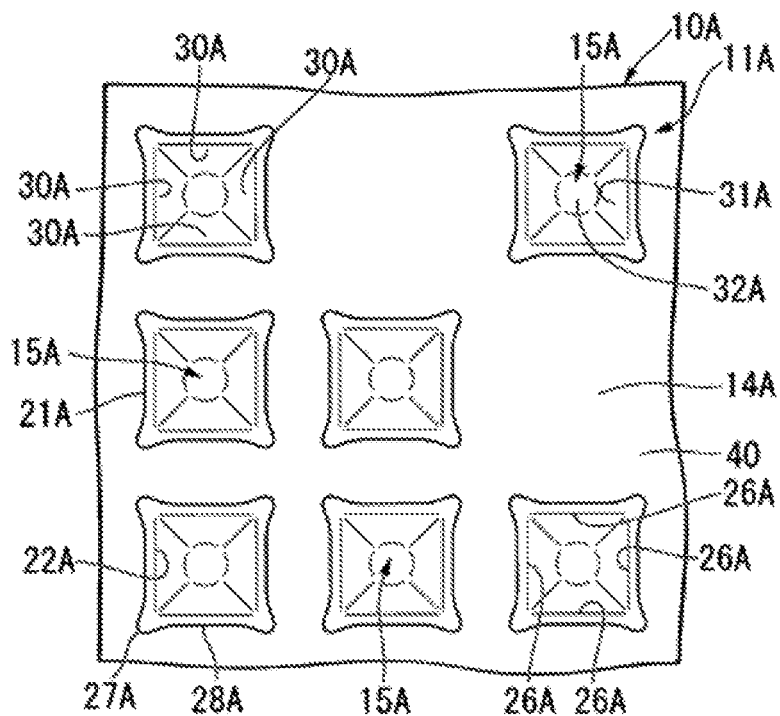
FIG. 9 is a plan view illustrating a part of the engraved code after the managed article is coated according to the embodiment.

In the engraved code 11A after the coating layer 40 is formed, the base surface 14 formed as the step prior to the coating process is covered by the coating layer 40 having the approximately constant thickness, and a surface of the coating layer 40 covering this base surface 14 serves as a planar base surface 14A. Further, in the engraved code 11A after the coating, the surface of the dot dented portion 15 having the quadrilateral pyramid shape is covered by the coating layer 40 having the approximately constant thickness. The dot dented portion 15 corresponds to a prior step dented portion including the opening peripheral edge portion 22 corresponding to a prior step opening peripheral edge portion that is formed in the engraved code formation process, which is the process prior to the coating process. A surface of the coating layer 40 covering the quadrilateral opening peripheral edge portion 22 serves as a quadrilateral opening peripheral edge portion 22A, and a surface of the coating layer 40 covering the dot dented portion 15 serves as a dot dented portion 15A having a quadrilateral pyramid shape. More specifically, the surface of the coating layer 40 covering the square opening peripheral edge portion 22 serves as the square opening peripheral edge portion 22A, and the surface of the coating layer 40 covering the dot dented portion 15 serves as the dot dented portion 15A having the quadrilateral pyramid shape. The engraved code 11A includes as many dot dented portions 15A as the dot dented portions 15 before the coating at the same positions as the dot dented portions 15 before the coating, as illustrated in FIG. 9.

As illustrated in FIG. 8, the dot dented portion 15A is formed with the surface of the dot dented portion 15 covered by the coating layer 40 having the approximately constant thickness, and therefore is one size smaller than the dot dented portion 15 while having a similar shape to the dot dented portion 15. In other words, in the dot dented portion 15A, the surface of the wall surface 30 is covered by the coating layer 40 having the approximately constant thickness, and a surface of the coating layer 40 covering the wall surface 30 serves as a planar wall surface 30A. Further, the surface of the bottom surface 32 is covered by the coating layer 40 having the approximately constant thickness, and a surface of the coating layer 40 covering the bottom surface 32 serves as a spherical bottom surface 32A of the dot dented portion 15A.

Therefore, the dot dented portion 15A includes four planar wall surfaces 30A inclined with respect to a depth direction of the dot dented portion 15A, and these four planar wall surfaces 30A are each inclined at a similar angle with respect to the base surface 14A. These four planar wall surfaces 30A form a peripheral wall surface 31A shaped like a quadrilateral pyramid truncated at a top side thereof. The bottom surface 32A of the dot dented portion 15A is formed so as to close a deep side of the peripheral wall surface 31A by being spherically curved.

Figure 10:
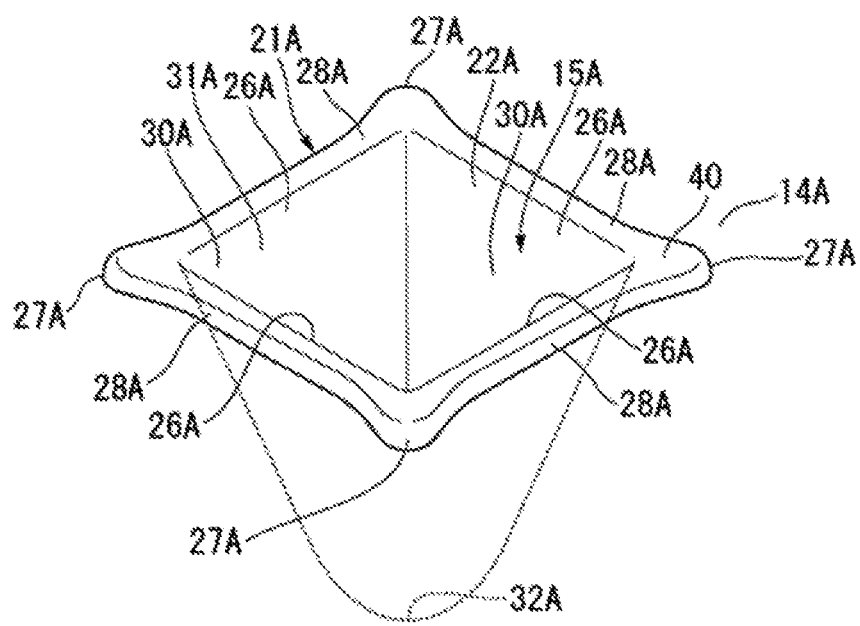
FIG. 10 is a perspective view illustrating the dot dented portion after the managed article is coated according to the embodiment.
Figure 11:
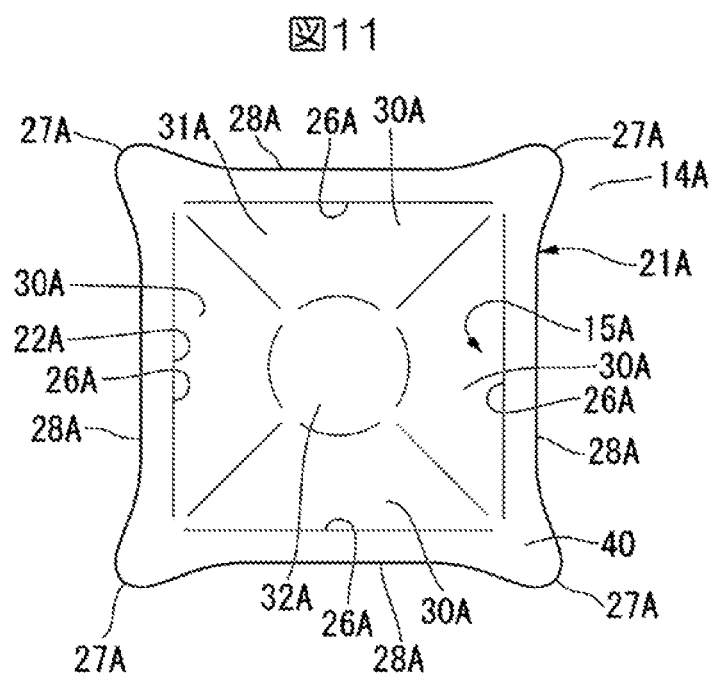
FIG. 11 is a plan view illustrating the dot dented portion after the managed article is coated according to the embodiment.

Then, as illustrated in FIGS. 3 and 4, the corner dented portions 25, which are dented at the acute angles outward along the diagonal direction, are formed at the four corner positions of the opening peripheral edge portion 22 of the dot dented portion 15, which corresponds to the prior stage dented portion formed in the engraved code formation process. Therefore, a coating material can be introduced into the four corner dented portions 25 when the coating layer 40 is formed in the coating process, which is the process subsequent thereto. This leads to filling of the coating layer 40 into each of the corner dented portions 25 and thus elimination of each of the corner dented portions 25 as illustrated in FIGS. 10 and 11, after the coating. In other words, this leads to a release of the coating material that is likely to be pooled at the four corner positions of the opening peripheral edge portion 22 of the dot dented portion 15 to each of the corner dented portions 25, thereby preventing or reducing an unnecessary pool of the coating material at the corner positions. As a result, as illustrated in FIGS. 10 and 11, the opening peripheral edge portion 22A of the dot dented portion 15A attains a square shape closer to an exact square than the opening peripheral edge portion 22 before the coating. Especially, in the case where the coating layer is provided after the engraved code formation process, like the present embodiment, it is more desirable that the coating layer such as the electroplating and the electrodeposition coating has a thinner thickness (thin enough to prevent the dented code from being filled with the coating layer). In the case where such electroplating or electrodeposition coating is employed, a strong electric field is generated at the corner portions and therefore increases the thickness of the coating such as the electroplating and the electrodeposition coating at these portions.

In other words, the opening peripheral edge portion 22A of the dot dented portion 15A after the coating is formed by four linear edge portions 26A, and the edge portions 26A circumferentially adjacent to each other are arranged perpendicularly to each other. The four edge portions 26A are upper end edge portions of the four wall surfaces 30A. The protruding portion 21A after the protruding portion 21 is coated also protrudes beyond the base surface 14A so as to surround an entire periphery of the dot dented portion 15A. In the protruding portion 21A, the opening peripheral edge portion 22A, which serves as an inner peripheral edge portion of the protruding portion 21A, is shaped as described above. Further, corner protruding portions 27A, which protrude at acute angles outward in the diagonal direction, are formed at four corner positions of the square, and liner intermediate extending portions 28A extend between the corner protruding portions 27A circumferentially adjacent to each other so that an outer peripheral edge portion of the opening peripheral edge portion 22A has the same shape as the shape before the coating. The intermediate extending portions 28A circumferentially adjacent to each other are arranged perpendicularly to each other.

As illustrated in FIG. 9, among the four wall surfaces 30A forming the dot dented portion 15A, two wall surfaces 30A that are one pair of wall surfaces facing each other extend along the arrangement direction of the dot allocable positions lined up in the same row, and two wall surfaces 30A that are the other one pair of wall surfaces facing each other extend in the arrangement direction of the dot allocable positions lined up in the same column. The dot allocable positions are set in such a manner that, when the dot dented portions 15A after the coating are formed at positions adjacent to each other, these dot dented portions 15A are spaced apart from each other, and the protruding portions 21A after the coating are also spaced apart from each other, in any of the row direction and the column direction.

In the readout apparatus, when the engraved code 11A is irradiated with the light from the direction perpendicular to the base surface 14A, the wall surfaces 30A of the dot dented portions 15A reflect the reflection light of the light from the light source in the direction different from the detection device, so that the detection device detects such an image that the dot dented portion 15A appears as a black dot having the same square shape (a square shape closer to the exact square than when the dot dented portion 15 before the coating is detected) as the opening shape formed inside the opening peripheral edge portion 22A thereof, and portions other than the dot dented portion 15A appear in white. The analysis device recognizes a shape of a collection of these black dots as the shape of the engraved code 11A. Further, the angles of the wall surface 30 and the wall surfaces 30A are little changed between before and after the coating, and therefore the function of reflecting the reflection light in the direction different from the detection device is kept constant. Therefore, readout accuracy is little changed between before and after the coating.

The engraved code described in Japanese Patent Application Publication No. 2006-134299 is formed by the plurality of conical dot holes, and therefore the optical detection of this engraved code leads to detection thereof as a collection of circular dots. Detecting the engraved code as the collection of circular dots in this manner undesirably increases a possibility of incorrect detection. Therefore, the analysis device should perform correction processing for correcting the circular dot into a quadrilateral. This correction processing corrects two incorrect recognition elements, i.e., includes the processing for changing the circle into the quadrilateral and processing for correcting a portion recognized as a white portion due to diffused reflection on the circular cone, and therefore raises a high possibility of incorrect detection.

On the other hand, in the engraved code 11 according to the embodiment, the dot dented portion 15 has the quadrilateral pyramid shape including the pair of wall surfaces 30 extending in the arrangement direction of the dot dented portions 15 forming the same row, and the pair of wall surfaces 30 extending in the arrangement direction of the dot dented portions 15 forming the same column. Similarly, in the engraved code 11A after the coating, the dot dented portion 15A also has the quadrilateral pyramid shape including the pair of wall surfaces 30A extending in the arrangement direction of the dot dented portions 15A forming the same row, and the pair of wall surfaces 30A extending in the arrangement direction of the dot dented portions 15A forming the same column. These shapes lead to the detection of each of the engraved codes 11 and 11A according to the embodiment as a collection of quadrilateral dots having a pair of sides extending along the arrangement direction of the dots forming the same row and a pair of sides extending along the arrangement direction of the dots forming the same column, when the engraved codes 11 and 11A are optically detected. Therefore, the present embodiment reduces the possibility of the incorrect detection compared to the detection of the engraved code as the collection of the circular dots, thereby leading to excellent detection of the engraved codes 11 and 11A.

Therefore, the present embodiment eliminates the necessity of performing the correction processing for correcting the circular dot into the quadrilateral and the correction processing for correcting the portion recognized as the white portion due to the diffused reflection with use of the analysis device like Japanese Patent Application Publication No. 2006-134299 (the correction may be carried out to further increase the accuracy).

Further, the bottom surfaces 32 and 32A of the dot dented portions 15 and 15A are spherically shaped, and therefore the dot dented portions 15 and 15A can be easily formed.

Further, the dot dented portion 15 is formed by the laser processing, and therefore can be easily formed.

Further, the dot dented portion 15A is formed by the laser processing and the coating processing, and therefore can be easily formed.

Further, the corner dented portions 25, which are dented at the acute angles outward along the diagonal direction, are formed at the four corner positions of the opening side of the dot dented portion 15 before the coating layer 40 is formed, which allows the coating material to be introduced into the corner dented portions 25 at the time of the coating. Therefore, the present embodiment can prevent or reduce inward projection of the coating layer 40 at the corner positions of the dot dented portion 15A after the coating. Therefore, the present embodiment allows the opening shape inside the opening peripheral edge portion 22A of the dot dented portion 15A to further approach a quadrilateral shape. Therefore, the present embodiment leads to the detection of the dot dented portion 15 as a dot further close to the quadrilateral when the dot dented portion 15 is optically detected.

Then, an angle α defined by the wall surface 30 of the dot dented portion 15 and a surface orthogonal to the depth direction of the dot dented portion 15 illustrated in FIG. 2, and an angle α defined by the wall surface 30A of the dot dented portion 15A and a surface orthogonal to the depth direction of the dot dented portion 15A illustrated in FIG. 8 are similar to each other, and how the engraved codes 11 and 11A were read out by the readout apparatus was tested while this angle α was changed. This test resulted as illustrated in the following table, table 1. There was no difference between the result regarding the engraved code 11 including the dot dented portion 15 before the coating and the result regarding the engraved code 11A including the dot dented portion 15A after the coating, and similar results were acquired therefrom.

Further, necessity or unnecessity of the correction indicated in the table 1 is a result of having tested whether the engraved codes 11 and 11A were able to be read out without the correction processing like the above-described processing performed thereon when they were read out by a commercially available readout apparatus. The unnecessity of the execution of the correction processing can reduce a time period required for the readout.

TABLE 1

| Angle α | Readout | Correction Processing |
|---|---|---|
| 22 Degrees | Yes | Unnecessary |
| 25 Degrees | Yes | Unnecessary |
| 32 Degrees | Yes | Necessary |
| 36 Degrees | Yes | Necessary |
| 38 Degrees | Yes | Necessary |

As clearly understood from this result, when the angle α was 32 degrees or larger, the engraved code 11 was able to be read out but the correction processing was necessary and a delay has occurred in the readout time period (a decoding time period). In consideration thereof, the angle α is set to 25 degrees or smaller. This setting, let alone allowing the engraved code 11 to be read out, also contributes to preventing or reducing the delay in the readout with the increase in the readout time period.

In the above-described embodiment, the dot dented portions 15 and 15A have been described referring to the example in which they have the quadrilateral pyramid shapes, but the dot dented portion 15 and the dot dented portion 15A may have different shapes as long as both of the opening peripheral edge portion 22 and the opening peripheral edge portion 22A have quadrilateral shapes, respectively. Therefore, for example, the shapes can also be changed like modifications illustrated in FIGS. 12A to 14. In the modifications illustrated in FIGS. 12A to 14, the dot dented portion will be described referring to the dot dented portion after the coating by way of example, but the corner dented portions dented at the acute angles outward along the diagonal direction are formed at the four corner positions of the opening peripheral edge portion before the coating, similarly to the embodiment.

Figure 12A:
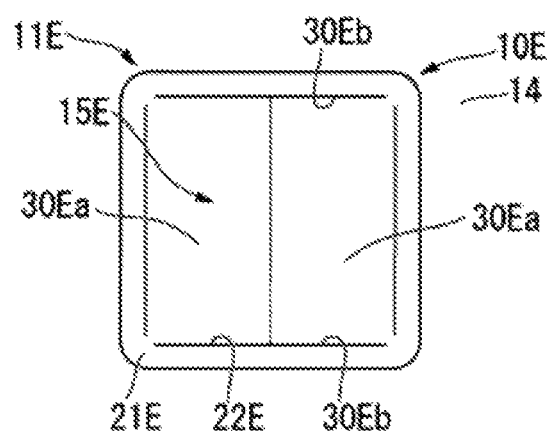
FIG. 12A is a plan view of a first modification of the managed article according to the embodiment.
Figure 12B:
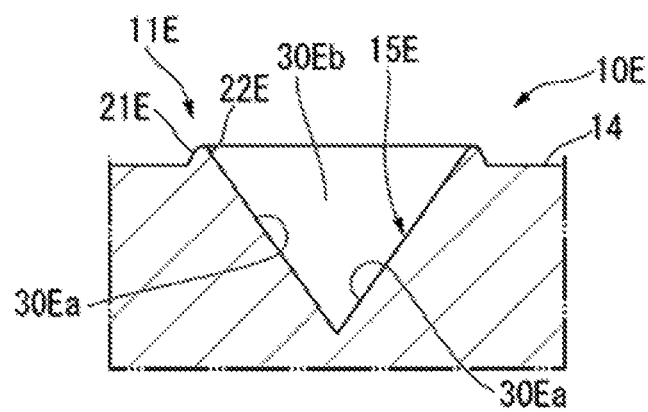
FIG. 12B is a front cross-sectional view of the first modification of the managed article according to the embodiment.
Figure 12C:
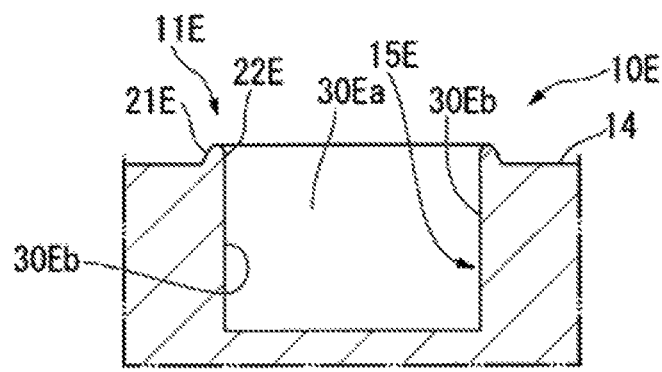
FIG. 12C is a side cross-sectional view of the first modification of the managed article according to the embodiment.

Like a managed article 10E according to a first modification illustrated in FIGS. 12A to 12C, a dot dented portion 15E of an engraved code 11E includes a pair of wall surfaces 30Ea and a pair of wall surfaces 30Eb. The pair of wall surfaces 30Ea is inclined at similar angles with respect to the base surface 14, and intersects with each other on a deep side. The pair of wall surfaces 30Eb is disposed perpendicularly to the base surface 14, and faces each other while extending in parallel with each other. In this case, an opening peripheral edge portion 22E of the dot dented portion 15E also has a quadrilateral shape, and a protruding portion 21E with the opening peripheral edge portion 22E formed on an inner peripheral edge portion thereof also has a quadrilateral shape.

Figure 13A:
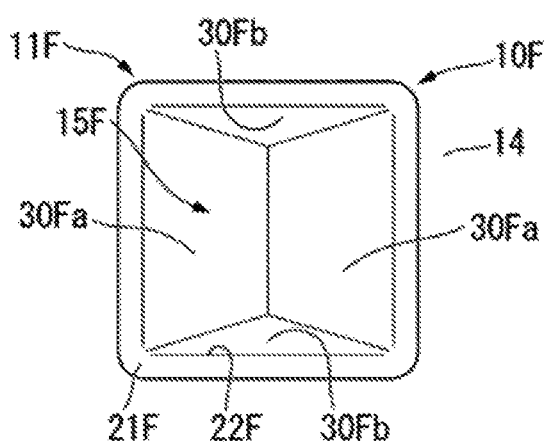
FIG. 13A is a plan view of a second modification of the managed article according to the embodiment.
Figure 13B:
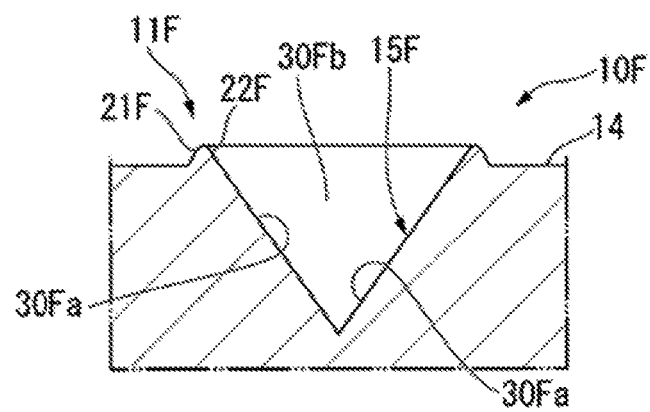
FIG. 13B is a front cross-sectional view of the second modification of the managed article according to the embodiment.
Figure 13C:
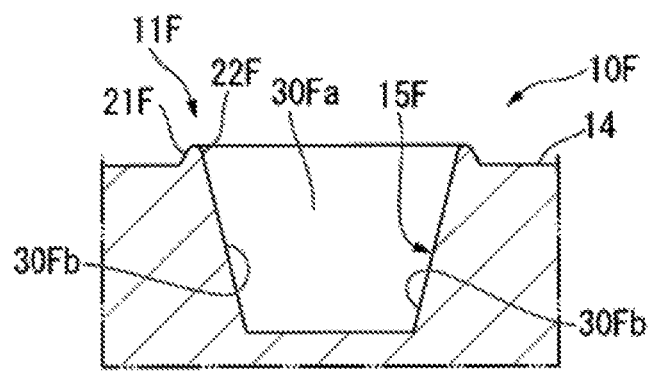
FIG. 13C is a side cross-sectional view of the second modification of the managed article according to the embodiment.

Like a managed article 10F according to a second modification illustrated in FIGS. 13A to 13C, a dot dented portion 15F of an engraved code 11F includes a pair of wall surfaces 30Fa and a pair of wall surfaces 30Fb. The pair of wall surfaces 30Fa is inclined at similar angles with respect to the base surface 14, and intersects with each other on a deep side. The pair of wall surfaces 30Fb is inclined at similar angles with respect to the base surface 14, and does not intersect with each other at the deep side. In this case, an opening peripheral edge portion 22F of the dot dented portion 15F also has a quadrilateral shape, and a protruding portion 21F with the opening peripheral edge portion 22F formed on an inner peripheral edge portion thereof also has a quadrilateral shape.

Figure 14:
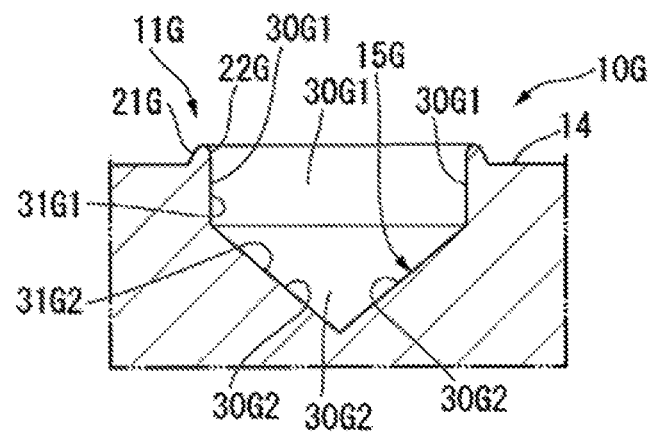
FIG. 14 is a side cross-sectional view illustrating a third modification of the managed article according to the embodiment.

Like a managed article 10G according to a third modification illustrated in FIG. 14, a dot dented portion 15G of an engraved code 11G includes an opening-side peripheral wall surface 31G1 and a bottom-side peripheral wall surface 31G2. The opening-side peripheral wall surface 31G1 includes four wall surfaces 30G1 located on an opening side, disposed perpendicularly to the base surface 14, and connected to one another so as to form a quadrilateral shape. The bottom-side peripheral wall surface 31G2 includes four wall surfaces 30G2 forming a quadrilateral pyramid shape on a deep side of the opening-side peripheral wall surface 31G1. In this case, an opening peripheral edge portion 22G of the dot dented portion 15G also has a quadrilateral shape, and a protruding portion 21G with the opening peripheral edge portion 22G formed on an inner peripheral edge portion thereof also has a quadrilateral shape. The bottom-side peripheral wall surface 31G2 can have the shape according to the first modification or the shape according to the second modification without being limited to the quadrilateral pyramid shape.

As another modification, the wall surface 30 may be formed as one surface by extending the orthogonal wall surface 30G1 illustrated in FIG. 14 to a deepest portion, and extending the inclined bottom-side peripheral wall surface 31G2 to a portion intersecting with the wall surface 30G1.

Further, in each of the above-described embodiment and modifications, the opening has the quadrilateral shape. This shape is most desirable, but the opening may have a polygonal shape such as a triangular shape, a pentagonal shape, and a trapezoidal shape, a circular shape, or an ecliptic shape. In this case, the above-described correction processing may become necessary.

In the above-described manner, the present embodiment brings about such an excellent effect that due to the provision of the wall surface formed by the plane inclined so as to prevent the light incident perpendicularly from the opening side of the engraved code from returning in the perpendicular direction, the readout accuracy is little changed between before and after the coating since the inclination angle of the plane is not changed even between before and after the coating. Obviously, the present embodiment achieves high readout accuracy even when the coating is not carried out, and therefore may be used for an uncoated managed article.

Next, specific application examples of the embodiment will be described.

Figure 15:
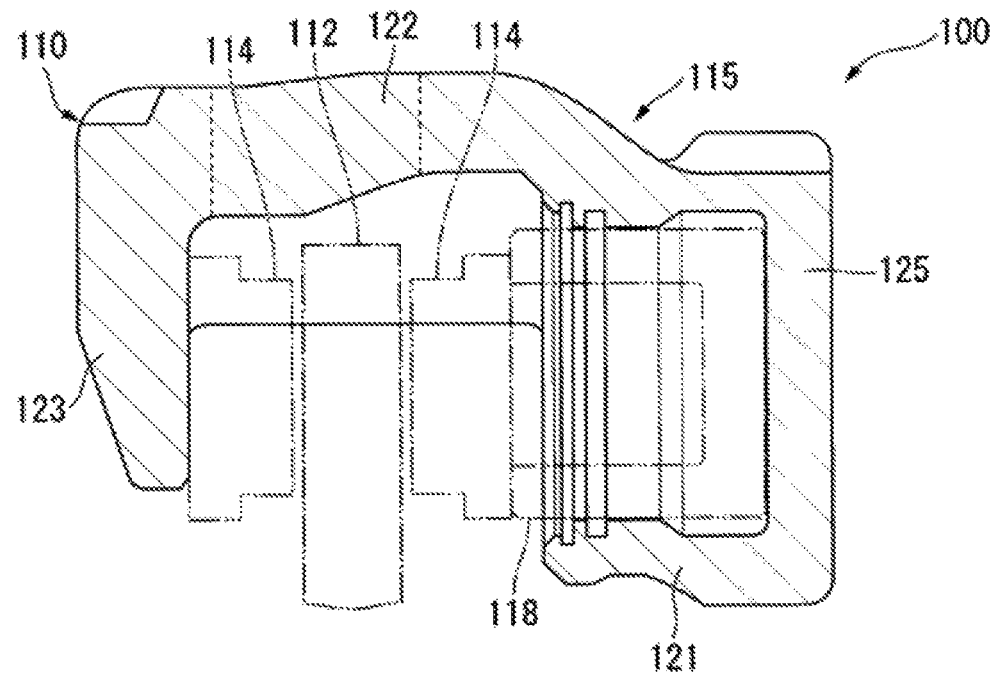
FIG. 15 is a cross-sectional view illustrating a disk brake as an application example of the managed article according to the embodiment.

The above-described managed articles 10, 10A, and 10E to 10G can be, for example, a caliper body 110 of a disk brake 100 illustrated in FIG. 15, which is an important security component. This caliper body 110 forms the disk brake 100 for a four-wheeled automobile together with other components indicated by alternate long and two short dashes lines illustrated in FIG. 15. The managed articles 10, 10A, and 10E to 10G may be applied to a caliper body of a disk brake for, for example, a two-wheeled vehicle other than the four-wheeled automobile. The caliper body 110 is a metallic product, and in particular, a cast product, and further in particular, a cast iron product.

As illustrated in FIG. 15, the disk brake 100 with the caliper body 110 mounted thereon functions to brake a rotation of a disk 112 rotating together with a not-illustrated wheel of the vehicle. This disk brake 100 includes a not-illustrated carrier, a pair of brake pads 114, and a caliper 115. The carrier is fixed to a non-rotatable portion of the vehicle. The pair of brake pads 114 is supported by the carrier movably in an axial direction of the disk 112 while being disposed so as to face both surfaces of the disk 112. The caliper 115 is supported by the carrier movably in the axial direction of the disk 112, and presses the pair of brake pads 114 against the disk 112. In the following description, a radial direction of the disk 112 in a state forming this disk brake 100 (a vertical direction in FIG. 15) will be referred to as a disk radial direction, the axial direction of the disk 112 (a horizontal direction in FIG. 15 and a vertical direction in FIG. 16) will be referred to as a disk axial direction, and a rotational direction of the disk 112 (a horizontal direction in FIG. 16) will be referred to as a disk rotational direction.

Figure 16:
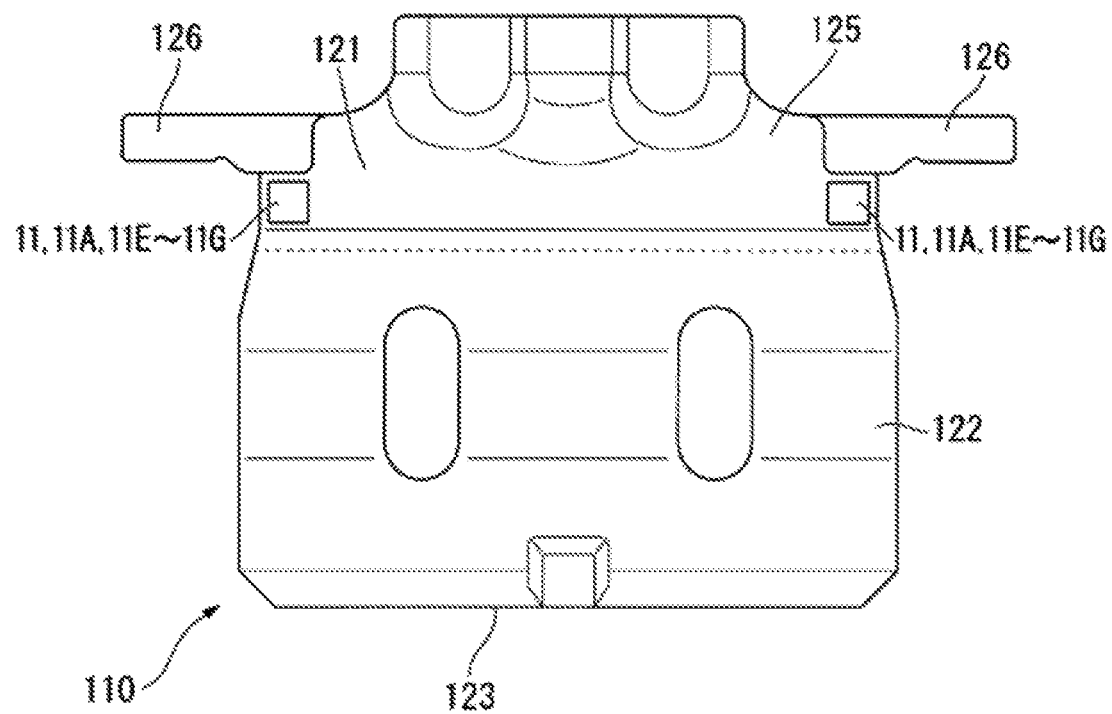
FIG. 16 is a plan view illustrating a caliper body as the application example of the managed article according to the embodiment.

The caliper 115 includes the caliper body 110, and a piston 118 provided in the caliper body 110. The caliper body 110 is constructed with a piston support portion 121 supporting the piston 118, a bridge portion 122, and a claw portion 123 integrally formed. The piston support portion 121 includes a cylinder 125 and a pair of arm portion 126. The piston 118 is inserted in the cylinder 125. The pair of arm portions 126 extends from the cylinder 125 toward both sides in the disk rotational direction as illustrated in FIG. 16. The caliper body 110 is supported by the not-illustrated carrier movably along the disk axial direction with use of a not-illustrated pair of pins attached to the pair of arm portions 126. The caliper 115 sandwiches the pair of brake pads 114 between the piston 118 protruding from the cylinder 125 due to a hydraulic pressure introduced into the cylinder 125 and the claw portion 123 to press the pair of brake pads 114 against the disk 112 to generate a frictional resistance, thereby generating a braking force.

As illustrated in FIG. 16, the caliper body 110 includes any of the engraved codes 11, 11A, and 11E to 11G formed at a base position of each of the pair of arm portions 126 on an outer surface of the cylinder 125 in the disk radial direction. The coating layer 40 is formed on the caliper body 110 by the plating processing after the engraved code is formed. When the piston and the like are mounted on the caliper body 110 and the caliper 115 is assembled, the engraved code after the coating that is formed on the caliper body 110 is used for management of the caliper 115.

Figure 17:
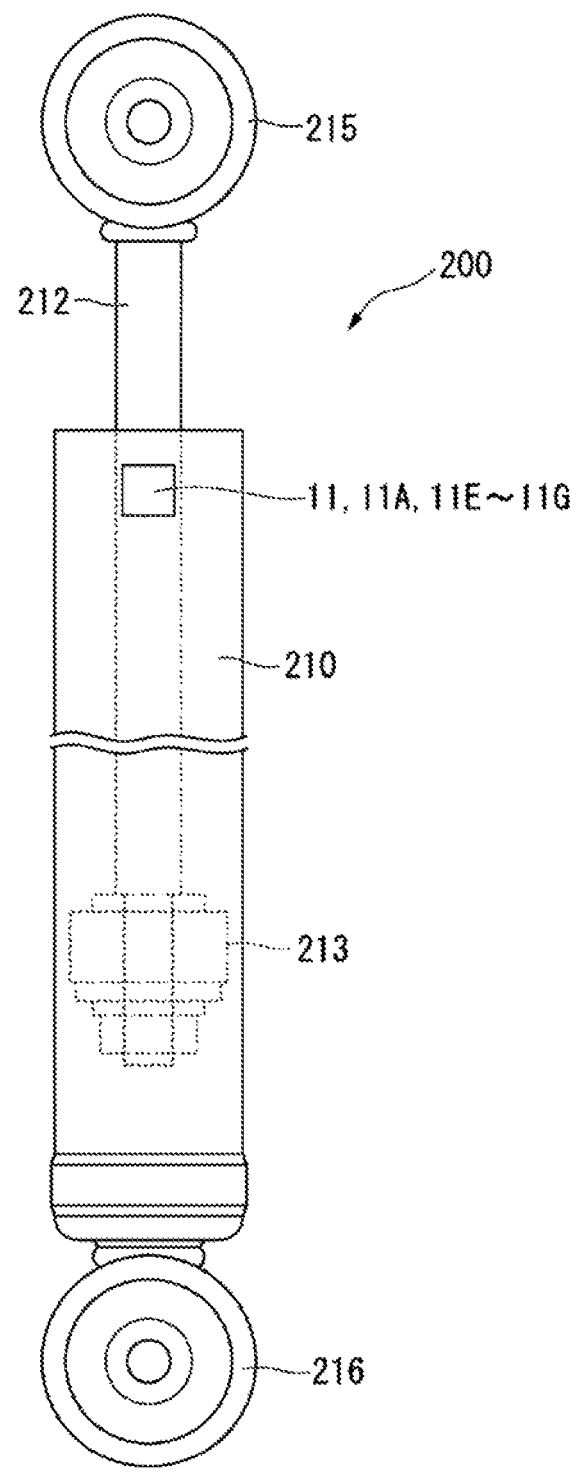
FIG. 17 is a front view illustrating a cylinder apparatus as an application example of the managed article according to the embodiment.

Further, the above-described managed articles 10, 10A, and 10E to 10G can be, for example, a cylinder 210 of a cylinder apparatus 200 illustrated in FIG. 17. The cylinder apparatus 200 includes the generally cylindrical cylinder 210 and a rod 212. Liquid or gas as fluid is sealingly contained in the cylinder 210. The rod 212 is disposed on a central axis of the cylinder 210, and also extends outward from a not-illustrated opening portion at one end of the cylinder 210 in an axial direction.

One end of the rod 212 that is disposed in the cylinder 210 is coupled with the piston 213, and the piston 213 divides the inside of the cylinder 210 into two chambers. The piston 213 is moved in the cylinder 210 according to a movement of the rod 212 integrally therewith to change volumes of the two chambers, thereby generating a damping force due to a flow resistance of the fluid that is generated at this time.

A mounting eye 215 is fixed at an end of the rod 212 on a protruding distal end side. Further, a mounting eye 216 is also fixed at an opposite end of the cylinder 210 from the protruding side of the rod 212.

The cylinder 210 includes any of the above-described engraved codes 11, 11A, and 11E to 11G formed on an outer peripheral surface thereof. The coating layer 40 is formed on the cylinder 210 by the cation coating after the engraved code is formed. When the piston 213, the rod 212, and the like are mounted on the cylinder 210 and the cylinder apparatus 200 is assembled, the engraved code formed on the cylinder 210 will be used for management of the cylinder apparatus 200.

As the managed article according to the above-described embodiment, for example, the following aspects of the present invention can be regarded as corresponding to them.

According to a first aspect, provided is a managed article including an engraved code formed thereon. The engraved code includes a plurality of dot dented portions. Each of the dot dented portions is formed by coating a prior stage dented portion with a coating layer. The prior stage dented portion includes a quadrilateral prior stage opening peripheral edge portion. Corner dented portions dented at acute angles outward in a diagonal direction are formed at four corner positions of the prior stage opening peripheral edge portion.

As a second aspect, in the managed article according to the first aspect, the corner dented portions dented at the acute angles outward along the diagonal direction are formed at the four corner positions of the prior stage opening peripheral edge portion of the quadrilateral prior stage dented portion before the coating layer is formed. Therefore, this configuration allows a coating material to be introduced into the corner dented portions at the time of coating. Therefore, the present configuration can prevent or reduce inward projection of the coating layer at the corner positions of the dot dented portion. Therefore, the present configuration allows an opening shape of the dot dented portion to have a quadrilateral shape. This results in detection of the dot dented portion as a quadrilateral dot when the engraved code is optically detected. Therefore, the present configuration allows the engraved code to be excellently detected.

Further, as a third aspect, the managed article according to the second aspect includes planes respectively extending from the other pair of sides around a dot that is different from the one pair of sides toward a bottom portion of the dot in a direction toward each other. For example, the dot dented portion has a quadrilateral pyramid shape including a quadrilateral opening peripheral edge portion with the coating layer formed on the prior stage dented portion having a quadrilateral pyramid shape including the prior stage opening peripheral edge portion, which facilitates formation of the dot dented portion as a dot dented portion including a quadrilateral opening peripheral edge portion.

Further, as a fourth aspect, in the managed article according to the third aspect, an angle defined by a wall surface of the dot dented portion and a surface orthogonal to a depth direction of the dot dented portion is 25 degrees or smaller, which allows the engraved code to be further excellently detected.

Further, as a fifth aspect, in the managed article according to any of the first to fourth aspects, a bottom surface of the prior stage dented portion has a spherical shape, which facilitates formation of the prior stage dented portion.

Further, as a sixth aspect, in the managed article according to any of the first to fifth aspects, the corner dented portions are filled with the coating layer, which allows the coating material to be introduced into the corner dented portions at the time of the coating. Therefore, the present configuration can prevent or reduce the inward projection of the coating layer at the corner positions of the dot dented portion. Therefore, the present configuration allows the opening shape of the dot dented portion to have the quadrilateral shape. Therefore, the present configuration allows the engraved code to be excellently detected.

Further, as a seventh aspect, in the managed article according to any of the first to sixth aspects, the prior stage dented portion is formed by laser processing, which facilitates the formation of the prior stage dented portion.

Further, as an eighth aspect, in the managed article according to any of the first to seventh aspects, the managed article is a caliper body of a disk brake, and therefore management of the caliper body and management of a caliper can be excellently carried out.

Further, as a ninth aspect, in the managed article according to any of the first to eighth aspects, the managed article is a cylinder of a cylinder apparatus including the cylinder, a piston movable in the cylinder, and a rod coupled with the piston and configured to extend outward from the cylinder. Therefore, management of the cylinder and management of the cylinder apparatus can be excellently carried out.

Further, as a tenth aspect, a readout code includes a plurality of dented dots formed on a surface of the managed article. An opening portion of each of the dots has a quadrilateral shape. Four corners of the opening portion each include a region extending in a direction away from a center of the dot. Surface processing is performed on the plurality of dots. Therefore, this configuration allows the readout code to be further excellently detected.

Further, according to an eleventh aspect, provided is an engraving method for engraving a readout code for article management on a managed article. The engraving method includes a first step of smoothing a surface of the managed article with use of laser light, a second step of forming the readout code on the smoothed surface of the managed article in a dented manner with use of laser light, and a third step of performing surface processing on the readout code formed in the dented manner by the second step. The second step is a step of forming a plurality of dented dots as the readout code. An opening portion of each of the dots has a polygonal shape. A corner of the opening portion includes a region extending in a direction away from a center of the dot.

The plane according to the present invention (the wall surface 30 according to the embodiment) is not especially limited regarding how planar the plane is, as long as the plane is a surface planer enough to reduce the diffused reflection of the light for the readout, thereby allowing the engraved code to be optically recognized as a black portion.

Having described the embodiment of the present invention, those skilled in the art will be able to easily appreciate that the embodiment described as the example can be modified or improved in various manners without substantially departing from the novel teachings and advantages of the present invention. Therefore, such modified or improved embodiment is intended to be also contained in the technical scope of the present invention. The features of the above-described embodiment may also be arbitrarily combined.

Further, the above-described embodiment of the present invention is intended to only facilitate the understanding of the present invention, and are not intended to limit the present invention thereto. Needless to say, the present invention can be modified or improved without departing from the spirit of the present invention, and includes equivalents thereof. Further, the individual components described in the claims and the specification can be arbitrarily combined or omitted within a range that allows them to remain capable of achieving at least a part of the above-described objects or producing at least a part of the above-described advantageous effects.

REFERENCE SIGN LIST 10, 10A, 10E to 11G managed article
11, 11A, 11E to 11G engraved code
15 dot dented portion (prior stage dented portion)
15A, 15E to 15G dot dented portion
22 opening peripheral edge portion (prior stage opening peripheral edge portion)
22A, 22E to 22G opening peripheral edge portion
25 corner dented portion
30, 30A, 30Ea, 30Eb, 30Fa, 30Fb, 30G1, 30G2 wall surface
32, 32A bottom surface
40 coating layer
100 disk brake
110 caliper body
200 cylinder apparatus
210 cylinder
212 rod
213 piston

The invention claimed is:

1. An article comprising:
an engraved code including a plurality of dot dented portions,
wherein:
each of the plurality of dot dented portions is defined by coating a prior stage dented portion with a coating layer,
the prior stage dented portion includes a polygonal prior stage opening peripheral edge portion, and
a corner dented portion dented at an acute angle outward is defined at a corner position of the prior stage opening peripheral edge portion.

2. The article according to claim 1, wherein:
the prior stage dented portion has a quadrilateral shape, and
the corner dented portion is dented at the acute angle outward along a diagonal direction of the prior stage opening peripheral edge portion.

3. The article according to claim 2, wherein each of the plurality of dot dented portions has a quadrilateral pyramid shape including a quadrilateral opening peripheral edge portion with the coating layer defined on the prior stage dented portion having a quadrilateral pyramid shape including the prior stage opening peripheral edge portion.

4. The article according to claim 3, wherein, for each of the plurality of dot dented portions, an angle defined by a wall surface of the dot dented portion and a surface orthogonal to a depth direction of the dot dented portion is 25 degrees or smaller.

5. The article according to claim 1, wherein a bottom surface of the prior stage dented portion has a spherical shape.

6. The article according to claim 1, wherein a thickness of the coating layer at the corner dented portion is thicker than another portion.

7. The article according to claim 1, wherein the prior stage dented portion is defined by laser processing.

8. An article comprising:
a readout code including a plurality of dented dots defined on a surface of the article,
wherein:
an opening portion of each of the plurality of dented dots has a polygonal shape, and a corner of the opening portion includes a V-shaped corner protruding portion which protrudes at an acute angle outward in a diagonal direction, and
surface processing is performed on the plurality of dented dots.

9. An engraving method for engraving a readout code on an article, the engraving method comprising:
smoothing a surface of the article with laser light;
forming a plurality of dented dots as the readout code, on the surface of the article which has been smoothed, in a dented manner with laser light; and
performing surface processing on the readout code formed in the dented manner,
wherein an opening portion of each of the plurality of dented dots has a polygonal shape, and a corner of the opening portion includes a V-shaped corner protruding portion which protrudes at an acute angle outward in a diagonal direction.

\* \* \* \* \*